United States Patent
Boezeman et al.

(10) Patent No.: US 6,188,396 B1
(45) Date of Patent: *Feb. 13, 2001

(54) SYNCHRONIZING MULTIMEDIA PARTS WITH REFERENCE TO ABSOLUTE TIME, RELATIVE TIME, AND EVENT TIME

(75) Inventors: John Junior Boezeman, Cary; Scott Michael Consolatti, Raleigh; Dennis Donald King, Cary, all of NC (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/625,084

(22) Filed: Mar. 29, 1996

(51) Int. Cl.[7] .................................................. G06F 15/00
(52) U.S. Cl. ............................................ 345/302; 707/501
(58) Field of Search .................................. 345/302, 326, 345/327, 328, 333, 473; 707/501, 513, 514

(56) References Cited

U.S. PATENT DOCUMENTS

| | | | |
|---|---|---|---|
| 5,515,490 * | 5/1996 | Buchanan et al. | 345/302 |
| 5,611,039 * | 3/1997 | Nobori et al. | 345/302 |
| 5,659,790 * | 8/1997 | Kim et al. | 345/302 |
| 5,659,792 * | 8/1997 | Walmsley | 345/302 |
| 5,680,639 * | 10/1997 | Milne et al. | 345/302 |
| 5,717,438 * | 2/1998 | Kim et al. | 345/302 |
| 5,861,880 * | 1/1999 | Shimizu et al. | 345/302 |

OTHER PUBLICATIONS

Iino et al., "An Object–Oriented Model for Spatio–Temporal Synchronization of Multimedia Information", *Multimedia, 1994 International Conference*, May 1994, pp. 110–119.*

* cited by examiner

*Primary Examiner*—Stephen S. Hong
(74) *Attorney, Agent, or Firm*—A. Bruce Clay; Myers, Bigel, Sibley & Sajovec, P.A.

(57) ABSTRACT

A multimedia title comprised of a plurality of parts is synchronized on a computer system. A co-tool automatically synchronizes at least one of the parts with reference to relative time. The co-tool may comprise a co-begin tool, a co-end tool, a co-occur tool, or a meet tool.

15 Claims, 16 Drawing Sheets

SYNCHRONIZING MULTIMEDIA PARTS WITH REFERENCE TO ABSOLUTE TIME, RELATIVE TIME, AND EVENT TIME

CROSS REFERENCE TO RELATED APPLICATIONS

This Application is related in subject matter to the following Applications filed concurrently herewith and assigned to a common Assignee:

U.S. application Ser. No. 08/625,085 filed by King, et al., entitled "Method and System for a Multimedia Application Development Sequence Editor" application Ser. No. 08/630, 866 filed by King, et al., entitled "Method and System for a Multimedia Application Development Sequence Editor Using a Wrap Corral" U.S. application Ser. No. 08/623,727 filed by King, et al., entitled "Method and System for a Multimedia Application Development Sequence Editor Using Spacer Tools" and U.S. application Ser. No. 08/622, 906 filed by King, et al., entitled "Method and System for a Multimedia Application Development Sequence Editor Using Time Event Specifiers" now issued U.S. Pat. No. 5,758,093.

The foregoing co-pending Applications are incorporated by reference.

TECHNICAL FIELD OF THE INVENTION

The present invention relates in general to computer software, and in particular, to a method and system for the creation of multimedia titles with a user friendly sequence editor using synchronizing tools.

BACKGROUND OF THE INVENTION

Multimedia is a term used in connection with computer systems to refer to software that processes, i.e., creates, edits, displays, synchronizes, etc., one or more files of time-based data. A multimedia computer system is designed to present various materials in various combinations of text, graphics, video, image, animation, audio, etc. Multimedia systems commonly comprise a combination of hardware and software including a personal computer, a CD-ROM drive, software editors, etc. The data for multimedia presentations are generally stored on hardware memory devices, such as a magnetic disc drive, a ROM compact disk player, video tape device, etc.

Application developers utilizing such a multimedia system may create programs that allow end users to view a multimedia presentation and manipulate various controls.

One of the most difficult problems that face creators/ developers of multimedia titles is synchronization of time and events. For example, a developer must be able to synchronize audio with a video presentation and provide images that appear and disappear over time. In many complex real world examples it is desirable for two or more multimedia items to be synchronized based on one or more of the following: an event; a relative time relationship (i.e., A Before B, A After B, A coincident with B); and an absolute time.

One product attempting to deal with time synchronization is DIRECTOR from Macromedia. DIRECTOR specifies time on a frame based metaphor. A Score is used in Director to specify when things occur in a movie (or title). The Score is a sequence of frames that hold cells of an animation and the indication to start playing audio or video. Things are specified linearly in Director. Frames are sequenced in order unless software code is written to manually go back to a previous frame. Frames show sequentially one after the other. To create an animation, for example, a developer must manually associate each cell in the animation with a frame in the Score. There is no convenient way to cause things to occur in the relative manner. If two animations are to co-occur, corresponding frames must be manually specified on an individual basis. A Time tool can be used to specify the playing of a video; however, nothing else can be processed (i.e., animation, other videos, etc.) while the video is playing. There is no point and click mechanism for wrap; code must be written to cause a wrap.

Another product, PREMIER from Adobe, is a video editing product. It has a facility called the CONSTRUCTION WINDOW (CW) where clips (i.e., video, scan images, QUICKTIME, movies, audio) are manipulated to create movies. The CW has channels, a timeline, and a time unit selector to adjust the scale of the ticks on the timeline. Pieces of video and images are put in channels and manually (i.e., drag) to a line with an absolute time and with other pieces of media. There is no notion of relative time or event time and no alignment helper co-tools. The notion of wrap does not exist for the creation of a movie.

Finally, ICONAUTHOR (IA) is a multimedia authoring tool which allows creation of applications that include time-based media, logic, database, etc. IA uses a flowchart metaphor to specify an application. Icons representing the playing of media, database access, comparisons, assignment, etc. are taken from a palette and connected into a flowchart. Processing in the application then follows the hierarchical structure defined in the flowchart. There is no editor to synchronize processing visually. Synchronization is done by checking logic and by corresponding logic that responds to events.

Thus, there is a need for a method that simply and visually provides synchronization of multimedia parts in relation to event time, relative time, and absolute time and uses synchronization tools.

SUMMARY OF THE INVENTION

The present invention disclosed herein comprises a method and system for synchronizing on a computer a multimedia title which is comprised of a plurality of parts. The present invention allows the time synchronization of various parts without the writing of code or time consuming repetitive steps.

In accordance with one aspect of the invention, a method is provided for synchronizing on a computer system a multimedia title which is comprised of a plurality of parts. The parts are automatically synchronized with reference to relative time using at least one co-tool. The parts may comprise a co-begin tool which causes two parts to initiate at the same time a co-end tool which causes two parts to end at the same time, a co-occur tool which causes two parts to automatically start and stop at the same time, or a meet-tool which automatically synchronizes a start time of one part with the end time of another type.

It is a technical advantage of the present invention that a developer may synchronize the initiation/ending of various parts without the necessity of writing code.

BRIEF DESCRIPTION OF THE DRAWINGS

For a more complete understanding of the present invention and for further advantages thereof, reference is now made to the following Detailed Description, taken in conjunction with the accompanying Drawings, in which.

DETAILED DESCRIPTION OF THE INVENTION

Figure 1:
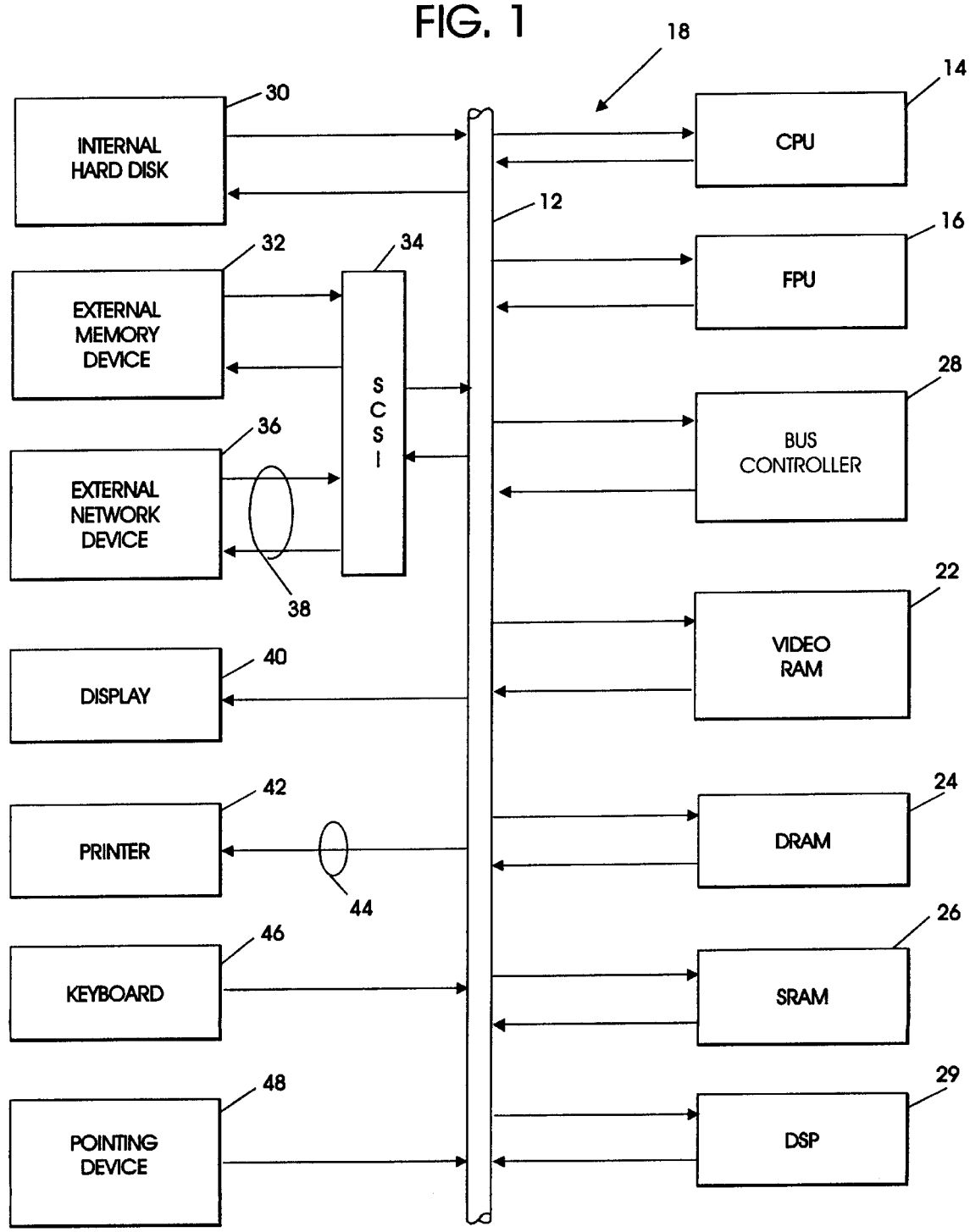
FIG. 1 is an illustration of a general computer architecture of a computer system within which the present invention may operate.

Referring first to FIG. 1, there is shown a general architecture 18 of a system of the type within which the present invention operates. Architecture 18 comprises a main bus 12, which serves to interconnect the various components, including at least some of the following (and possibly other additional components): CPU 14, flowing point unit 16, bus controller 28, video RAM 22, dynamic RAM 24, static RAM 26, digital signal processor 29, internal hard disk 30, external memory device 32 (connected for example via a SCSI port 34), external network devices 36 (communicating for example over an ethernet network 38, and connected via SCSI port 34), a display device 40 (such as a CRT), printer 42, keyboard 46, and pointing device 48 (such as a mouse, track ball, etc.). The interconnection and functioning of each of these components in an operating computer system are well known in the art. However, the function and significance of particular components will be discussed in further detail where appropriate.

While the discussion that follows describes the invention in terms of the software programming environment commonly known as object oriented software design (such as a ScriptX from Apple Computer), it will be appreciated that the functionality of the present invention is not limited to such environments. However, as support for one possible environment in which the program invention operates, a description of certain relevant details of object oriented programming environments is presented.

In an object oriented programming language, the fundamental data structures of the language are objects, programming elements that contain a specification of both data and actions. Data is specified in local variables, referred to as instance variables, contained within the object. Actions, or methods, are sub-programs that operate on the variables. Methods are invoked by messages sent from one object to itself or other objects.

There are two fundamental object constructs: classes and instances. Classes have a set of variables and methods and can be thought of as templates for object types. Instances (or objects) are particular run-time instantiations of a class. An object provides storage for variables defined in its class. Each instance has its own version of those variables. When a message is sent to an object, the object looks to methods defined in its class to determine how the message is to be executed.

Classes are defined in terms of a class hierarchy. A class inherits all variables and methods from classes higher in the hierarchy, referred to as super classes. The inheriting class may be referred to as a subclass or child of the superclass. The variables and methods inherited from a superclass are available to the inheriting class as if they were defined within the inheriting class. Note that if a subclass has multiple superclasses, all the variables and methods from each superclass are inherited. This is often referred to as multiple inheritance.

There are two types of variables that may be defined within a class. The first are class variables, whose storage is shared by all instances of the defining class. Class variables are typically used for coordination between classes and instances. The second are instance variables, which are variables specific to each particular instance. That is separate storage space is allocated to each instance variable of each instance.

Methods specify the action to be performed when a message is sent to an object. When the message is sent to an object, the message name is matched against method names defined for that object. The method actually executed is the method with the same name as the message that is defined lowest in that object's class hierarchy.

Messages can have parameters. When a message is sent, all actual parameters are fully evaluated before a method is located for that message. Methods have formal parameters, corresponding to the actual parameters in the message, and temporary variables. Temporary variables may be created when the message is executed, and are available only with the scope of that method while the method is executing.

Programs perform by sending messages to objects which invoke a method in an object's class or class hierarchy. Often, methods send messages to other objects, invoking other methods. Typically, each method returns a result to the sender. At the heart of many languages, and especially an object oriented language, is a program segment for interpreting and evaluating messages and keeping track of where to return when methods call other methods.

Object oriented programming environments can be implemented with many programming languages. Some common examples of object oriented environments are: the C++ environment, the Smalltalk environment, and the ScriptX environment.

Software program code which employs the present invention is typically stored in memory, such as the internal hard disk 30, from which a developer may access the code. For distribution purposes, the software program code may be embodied on any of a variety of known media for use with a data processing system, such as a diskette or CD-ROM, or may be distributed over a network of some type to other computer systems for use by users of such other systems. Such techniques and methods for embodying software code on media and/or distributing software code are well known and will not be further discussed herein.

The present invention will now be discussed in conjunction with an example and with reference to FIGS. 2–17. As previously stated, one of the most difficult problems facing creators of applications that incorporate multimedia is the time and event synchronization problem. An example of this might be where an application requires the following types of processing: 1) the pressing of a push button causing an animation to play; 2) during the course of the animation, a piece of audio is also played; 3) at the simultaneous ending of the animation and audio, a video plays, the second half of which plays at twice the rate of the first half; 4) independent of 1–3 above, an image appears ten seconds after the push button is pressed, remains visible for 20 seconds while moving across the screen, and then disappears; and 5)shortly after the video begins an exit push button appears on the display.

Figure 16:
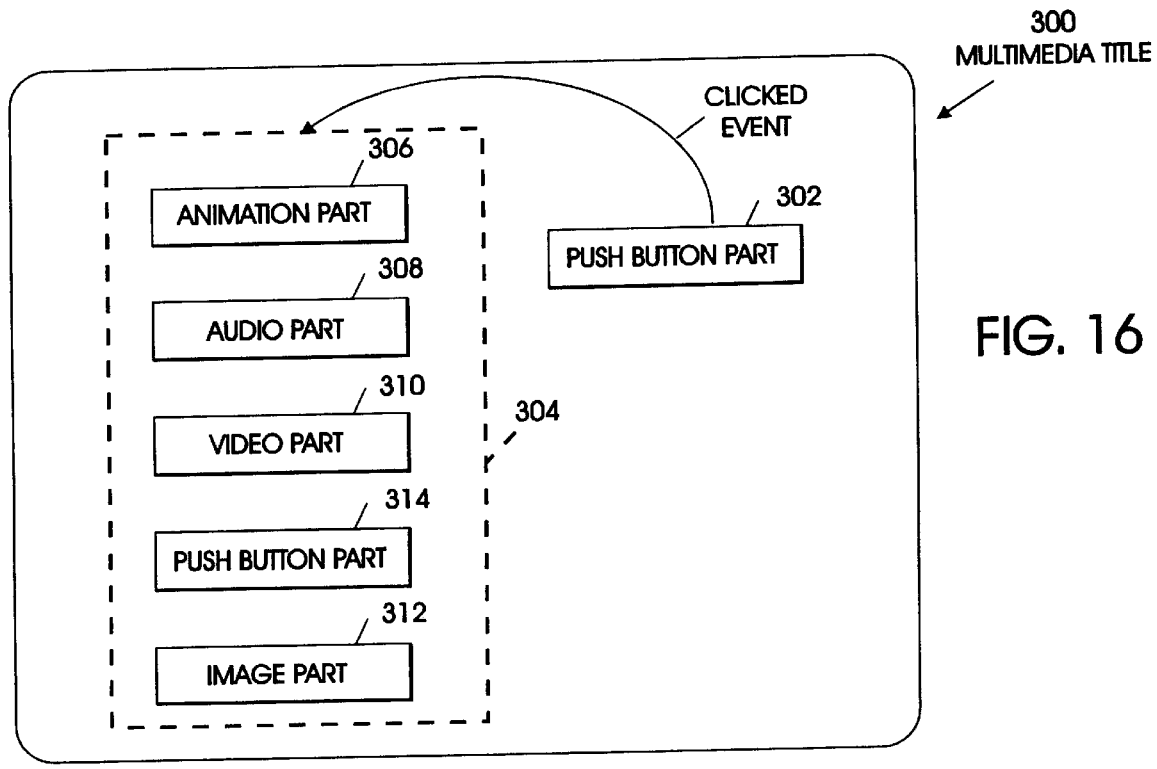
FIG. 16 is a schematic illustration of a multimedia title.

Referring to FIG. 16, a real world example that might require this type of processing could be a computer based training application (a multimedia title 300) for a student in an automotive service center. The student would click an arbitrary part, a push button 302, on a computer to view information about how to assemble a previously selected automobile part. The arbitrary event, i.e., clicking the push button, would trigger a sequence of time synchronized processing 304 starting with an animation part sequence 306 that showed the sub-components of the automobile parts connecting themselves together so the student could learn how the componentry is assembled. The audio player (audio part 308) that runs coincident to the animation would be an oral description of how the assembling process is accomplished. When the animation and audio complete, a video (video part 310) is played that gives a 360 degree view of the assembled auto part for perspective purposes and completeness of the student's background. Due to time constraints, the second half of the video plays at twice the rate of the first half. Independent of the above processing, an image (image part 312) is displayed 10 seconds into the playing of the animation, and moves across the screen for 20 seconds. The image is a welcome message wishing the student good luck. Also independent of the above processing, shortly after the video begins playing, an exit push button (push button part 314) appears at the bottom of the screen allowing the student to exit the video if it is deemed unnecessary to further understanding.

To solve the synchronization problem as described above, a sequence editor in accordance with the present invention is provided. The sequence editor is a mechanism that allows a user to synchronize relative time, absolute time and event time together in an easy to use manner. The solution assumes that items for synchronization (such as an animation, video, audio, image) have been previously identified and selected by a user. There are several tools which allow selection of these types of items for synchronization and further description is not required.

The sequence editor approach to synchronization starts with events. Events are unpredictable and often occur randomly. They can be caused by user interaction or other asynchronous activity. Examples of events could be a push button being clicked, a video playing to completion, an absolute time being reached, or an error condition occurring. An event is defined by the program creator, and is a notification of some occurrence of some thing. The sequence editor organizes its time based specification by event. In other words, a user specifies an event that will initiate a sequence of time based processing. In the example that follows, the event is the clicking (selection of) a push button, and the time based processing is the animation and media related playing.

Figure 2:
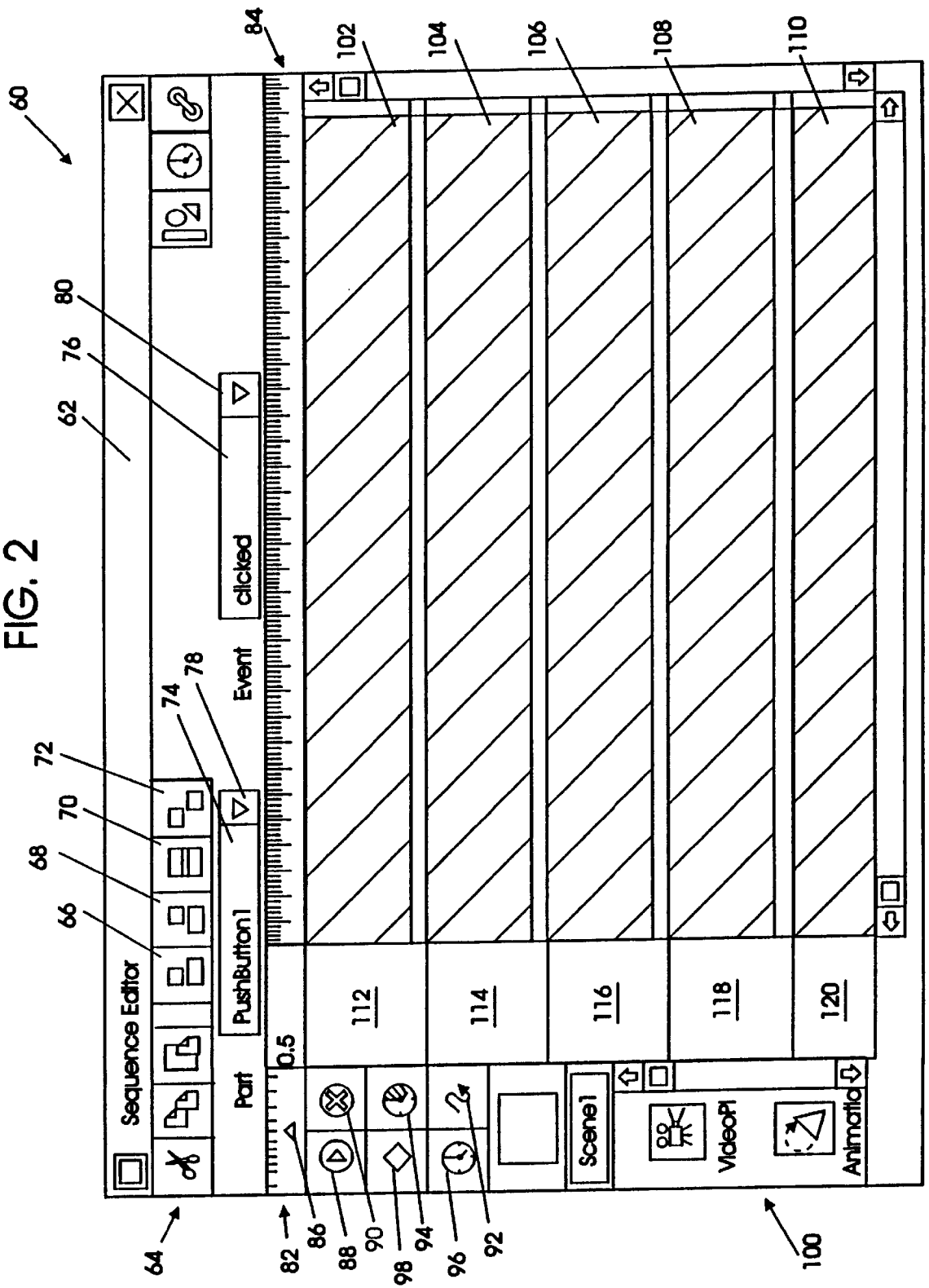
FIG. 2 is a graphical illustration of a sequence editor in accordance with the present invention.

Referring now to FIG. 2, a sequence editor screen 60 is shown. Directly beneath a title bar 62, is a toolbar 64. On the toolbar 64 are a plurality of convenience tools including a co-begin tool 66, a co-end tool 68, a co-occur tool 70, and a meet tool 72.

The co-begin tool 66 allows parts which are selected, as will be discussed later, to begin at exactly the same time. Similarly, the co-end tool 68 allows parts to end at exactly the same time. The co-occur tool 70 allows parts to begin and end at exactly the same times, while the meet tool 72 allows one part to begin immediately upon the ending of another. The use of these tools will be discussed in greater detail below. Beneath the toolbar 64 is a part starter 74 and an event starter 76. By clicking on the scroll arrows 78 and 80, respectively, drop down boxes appear for the selection of an appropriate, arbitrary part and an appropriate, arbitrary event.

Below the part and event starters 74 and 76, there is a zoomer 82 and a time-line 84. The zoomer 82 allows the setting of a time value for each tick interval on the time-line 84. By moving a slider 86, a tick interval setting may be selected. As shown in FIG. 2, the tick interval setting is for 0.5 seconds. Therefore, each tick interval on time-line 84 represents 0.5 seconds.

Directly below the zoomer 82 are a plurality of adjustable, drag and drop tools for use by the developer. A play spacer 88 allows the developer to indicate how long a time based media part (i.e., processing) is to play. A hide spacer 90 is used to hide a part that would otherwise be visible. A move spacer 92 causes an object to move along a path while continuing to play or be visible. A rate spacer 96 changes the rate that the media is played for the length of time of the spacer.

Time event specifiers are also located beneath the zoomer 82. A time event specifier 98 specifies an event to be generated at a particular point in time, as will be subsequently discussed in greater detail. A periodic time event specifier 94 specifies an event to be generated at a particular point in time and at subsequent intervals thereto.

A bullpen 100 is used as a staging area for parts on a scene that have been selected previously. As shown in sequence editor screen 60, the parts for scene one are stored in the bullpen 100.

Below the time-line 84, are a plurality of visibility channels 102, 104, 106, 108 and 110. Corresponding to each visibility channel 102 through 110, are thumbnail areas 112, 114, 116, 118 and 120. The thumbnail areas are used to place parts which will be synchronized by the sequence editor. The visibility channels are used to specify the period of time that the part within the appropriate thumbnail area is visible or is played.

As indicated above, the remaining FIGS. 3–17 will be used to describe a real world example of a multimedia application that an application developer might create. The example is the pressing of a push button to cause an animation to play (an animation showing sub-components of an automobile part connecting itself together). During the course of the animation, a piece of audio is also played (an oral description of how the assembling process is accomplished, plus some music). At the simultaneous ending of the animation and audio, a video plays (a 360 degree view of the assembled part for perspective purposes and completeness of the student's background). The second half of the video is to play at twice the rate of the first half. Independently, an image will appear 10 seconds after the push button is pressed, remain visible and move across the screen for 20 seconds and then disappear (a welcome message). Shortly after the video begins, an exit button appears on the display (allows the student to exit the video if deemed unnecessary).

Figure 3:
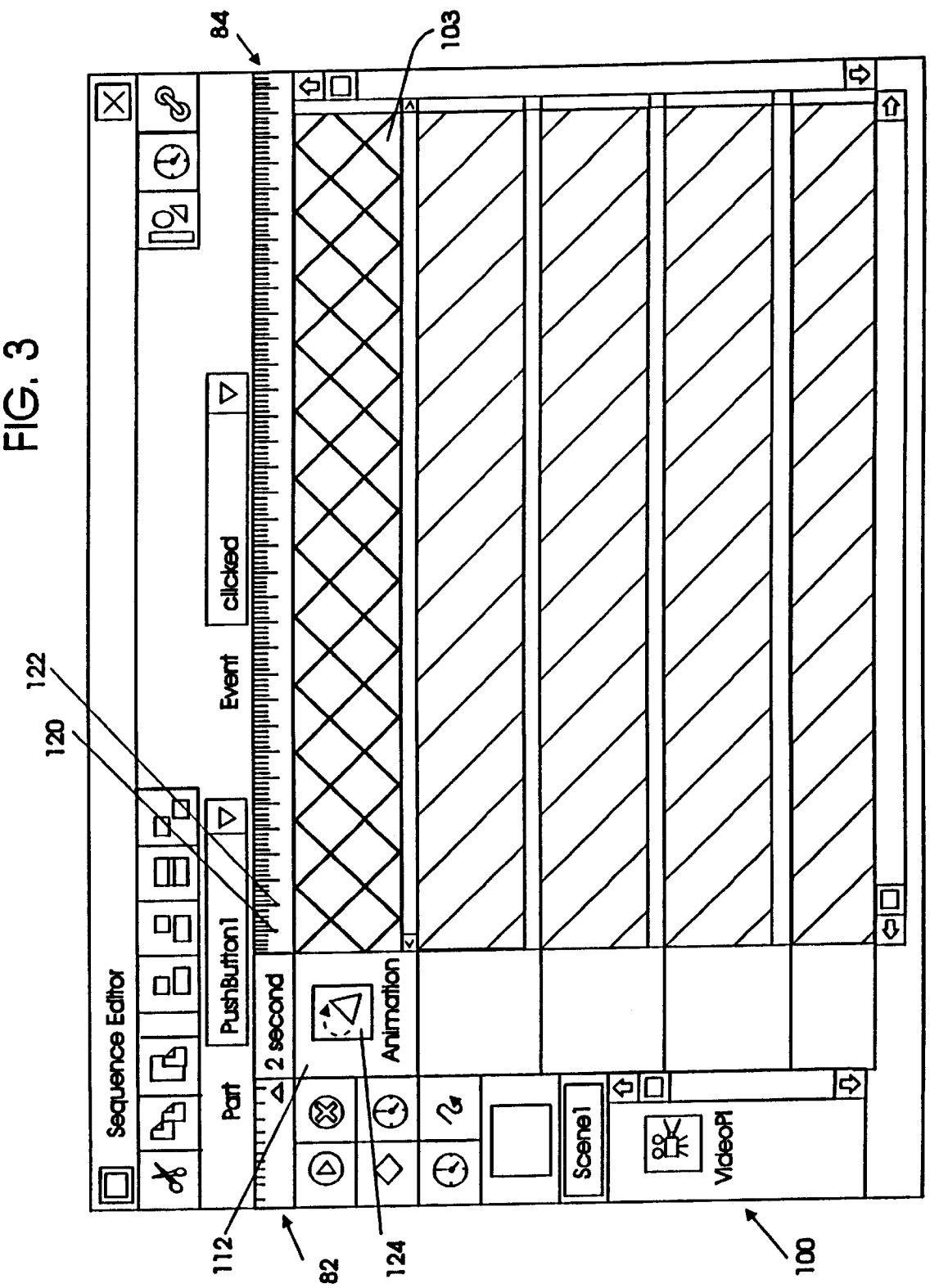
FIG. 3 is an illustration of placement of a part within a channel.

Referring to FIG. 3, the developer has set the zoomer 82 for a two second interval. Therefore, each tick mark on the time-line 84 will indicate two seconds with each larger tick mark 120 indicating ten seconds and each largest tick mark 122 will indicate twenty seconds. The developer has also dragged the animation part 124 from the bullpen 100, and dropped it into thumbnail area 112. Upon placement of the animation part 124 in the thumbnail area 112, the visibility channel 102 (See FIG. 2) is changed to a show block 103 which indicates the animation part 124 can appear along the entire time-line 84.

Figure 4:
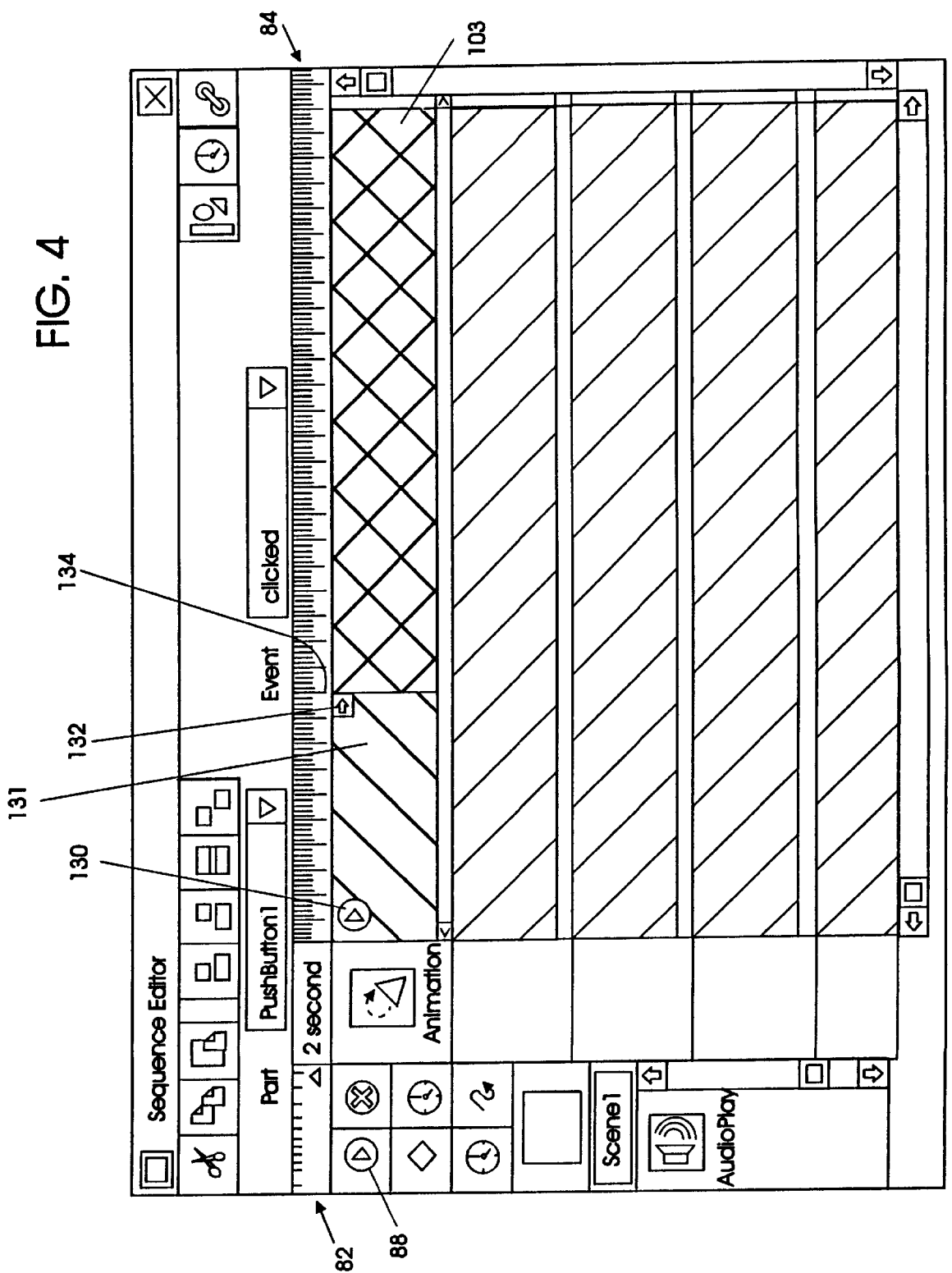
FIG. 4 is an illustration of the play tool.

Referring to FIG. 4, the play tool 88 has been dragged and dropped onto the show block 103 as indicated by a play icon 130 and a play area 131. By dragging a size handle 132 to line up under a 100 second tick mark 134 on the time-line 84, one can see that the animation player will play from the moment the push button is clicked until 100 seconds of absolute time have elapsed.

Figure 5:
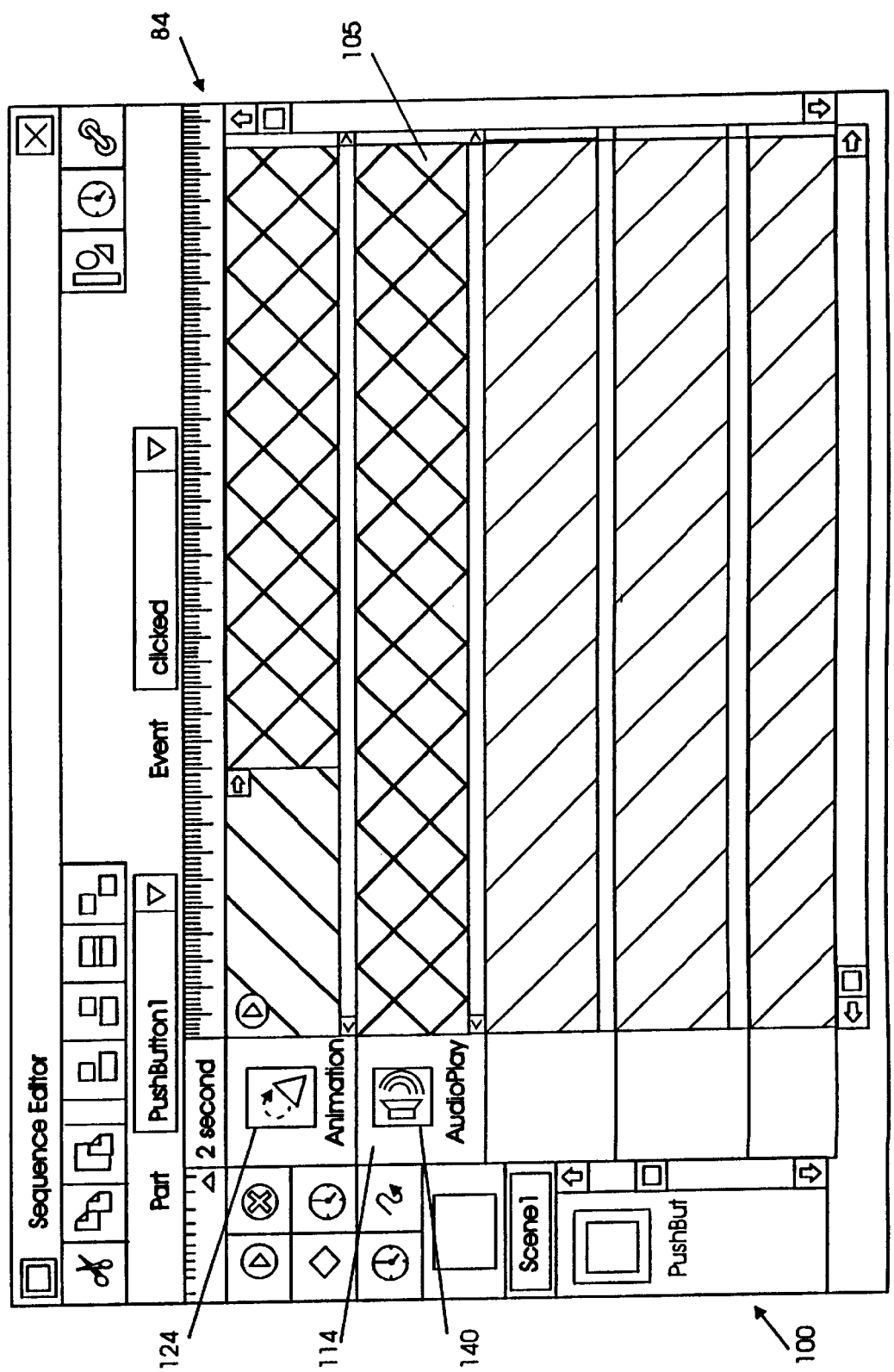
FIG. 5 is an illustration of placement of an audio player part.

Referring to FIG. 5, an audio player part 140 has been dragged from the bullpen 100 and dropped into the thumbnail area 114. As discussed above with reference to animation player 124, upon dropping the audio player 140 into the thumbnail area 114 a visibility block 105 is placed in the visibility channel 104 (FIG. 2). The visibility block 105 extends throughout the length of the time-line 84. For the case of a non-visual time based media part (i.e., audio), visibility implies that the part can be played.

Figure 6:
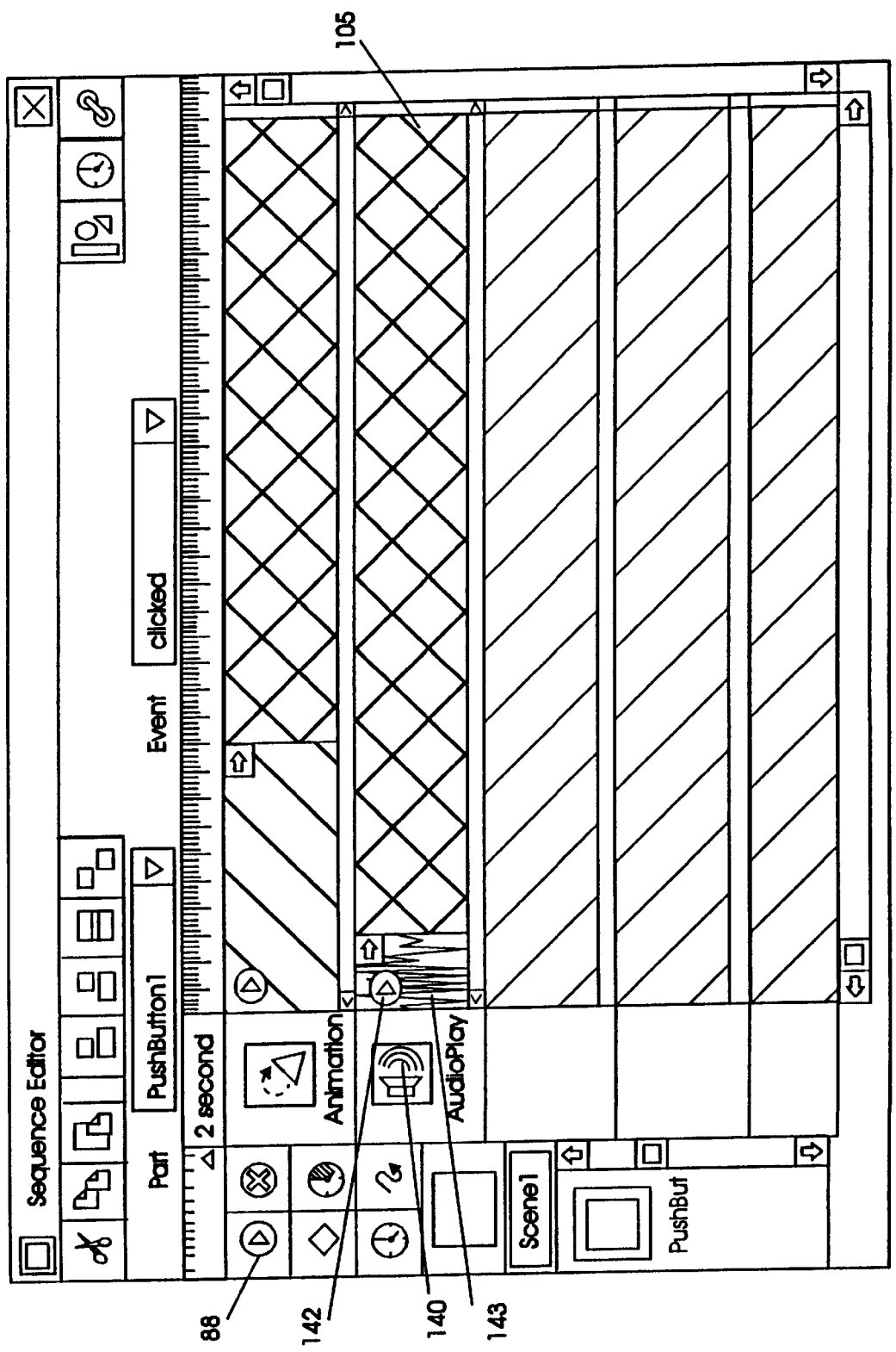
FIG. 6 is an illustration of the play tool in conjunction with the audio player part.

Referring to FIG. 6, the play tool 88 is dragged and dropped onto the visibility block 105 as indicated by a play icon 142 and a play area 143. Since a piece of audio plays for a finite period of time, the audio player part 140 can be seen to have an approximate duration of about 30 seconds. As will be discussed in greater detail, it is intended in this example to make the audio coincident throughout with the animation. The present invention allows such synchronization with a few simple steps.

Figure 7:
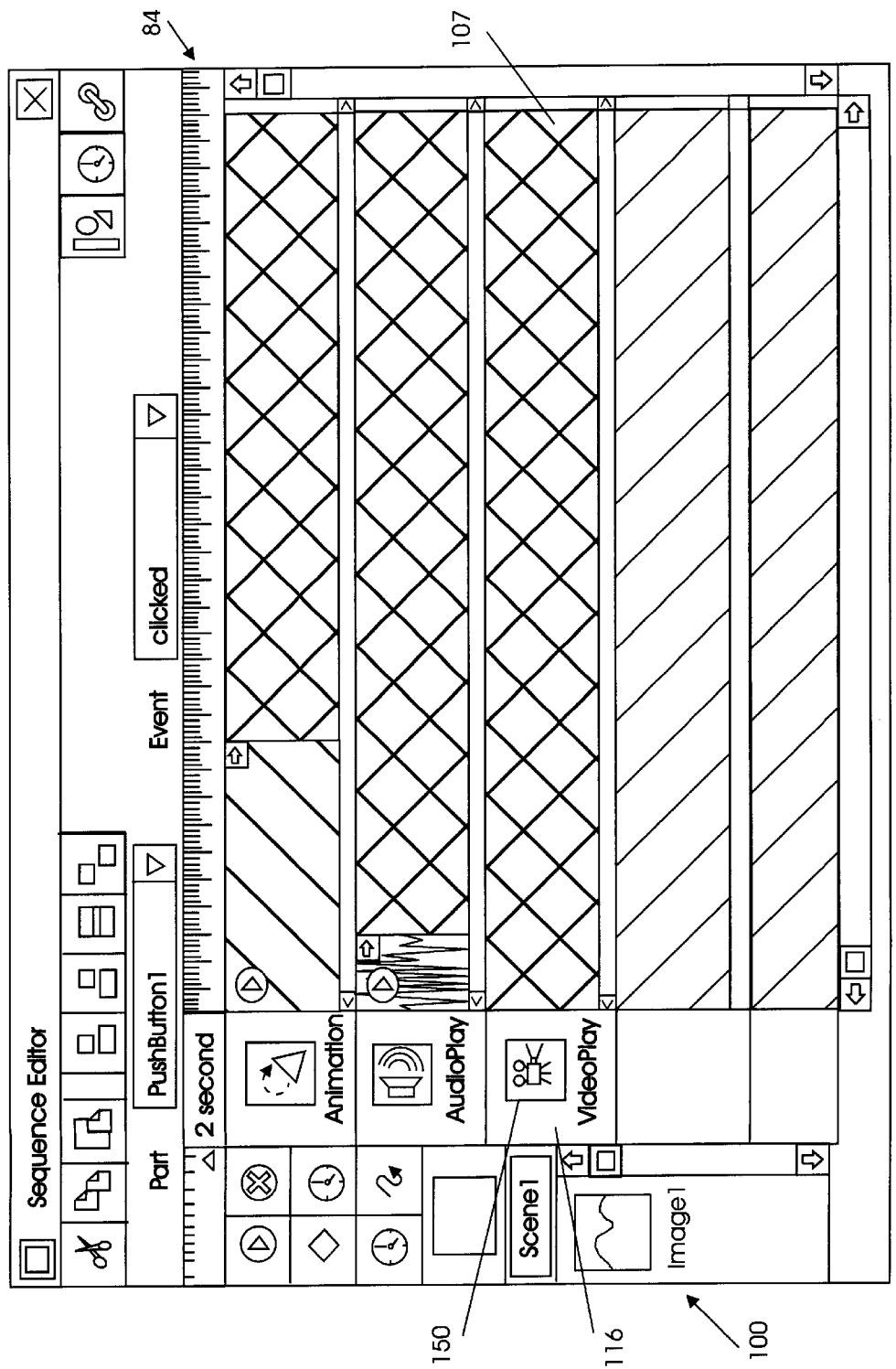
FIG. 7 is an illustration of the placement of a video player part.
Figure 8:
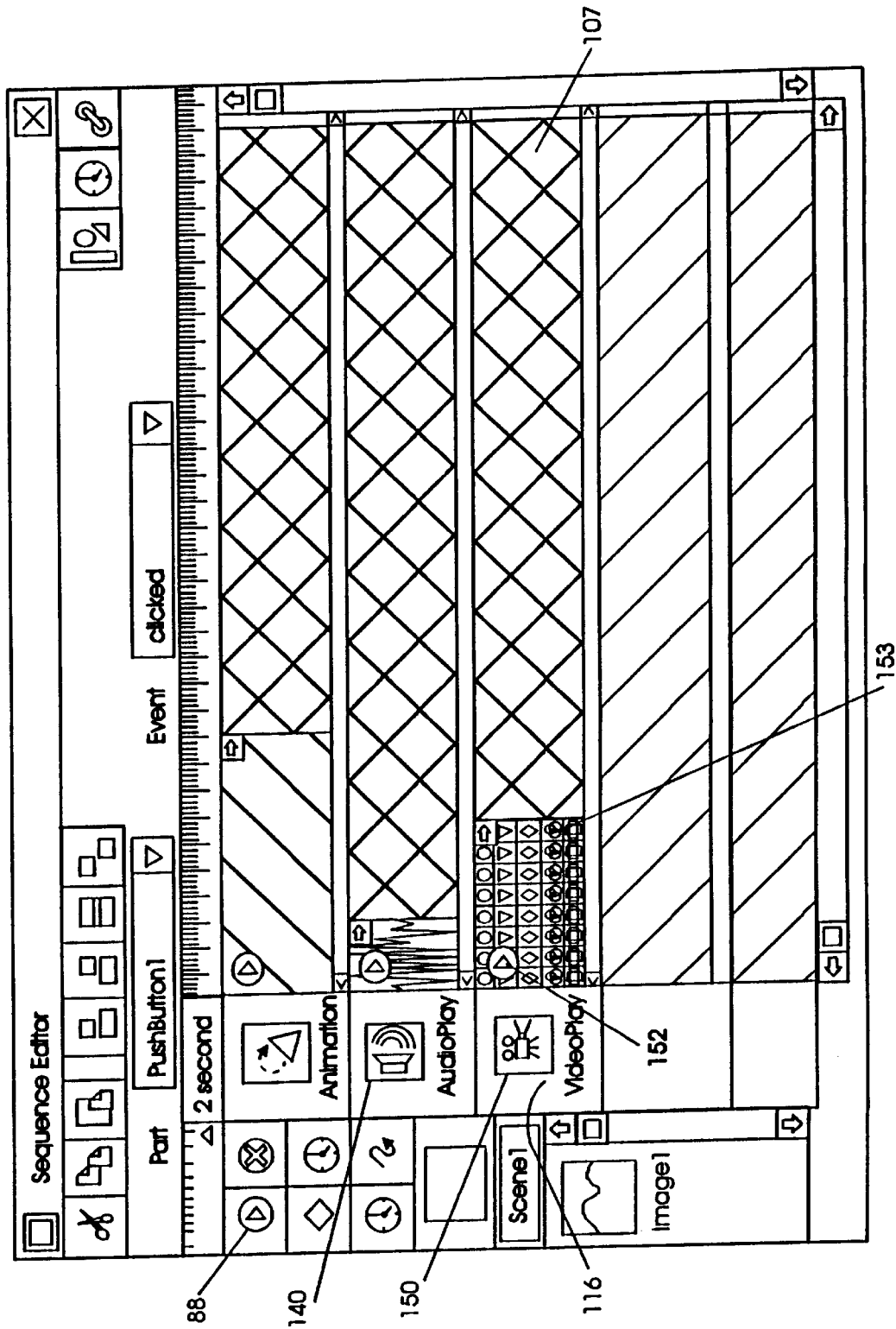
FIG. 8 is an illustration of placement of the play tool in conjunction with the video player part.

Referring to FIG. 7, a video player part 150 has been dragged from the bullpen 100 and dropped onto the thumbnail area 116. As before, the visibility channel 106 (FIG. 2) is changed to indicate a show block 107 throughout the time-line 84. The play tool 88 is dragged and dropped onto the show block 107 (FIG. 8), as indicated by a play icon 152 and a play area 153. As with the audio portion of audio player part 140, the video player part has a finite length and therefore plays for a specified amount of time which is shown as the play area 153.

Figure 9:
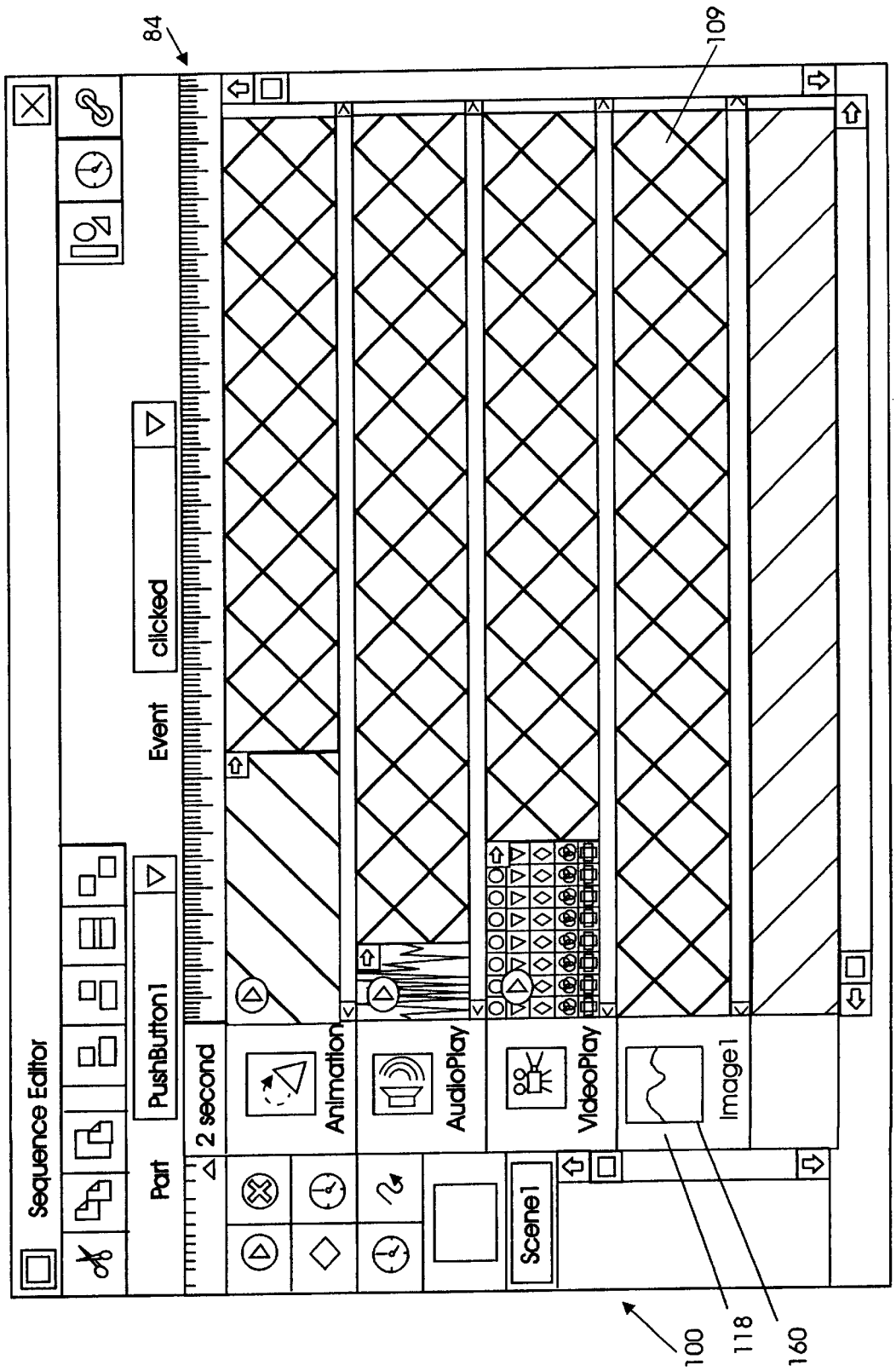
FIG. 9 is an illustration of placement of an image part.

Referring to FIG. 9, the developer has selected Image 1 part 160 from the bullpen 100 and dropped it into thumbnail area 118. The visibility channel 108 is then changed to a show block 109 throughout the time-line 84.

Figure 10:
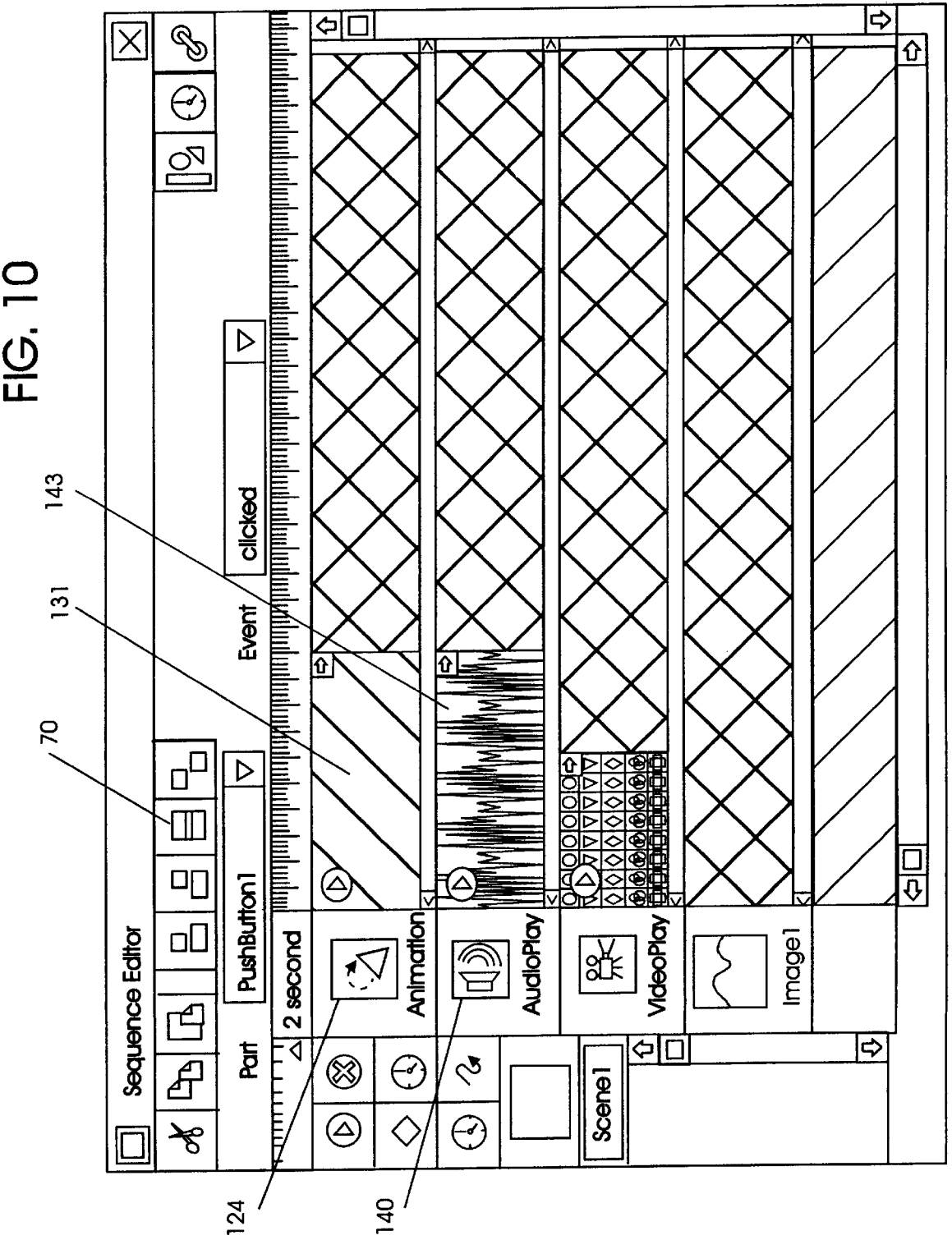
FIG. 10 is an illustration of the use of a co-occur tool.

As was stated in the real world example above, the animation and audio were to start and stop at the same time. By utilizing the present invention, the developer may simply ensure that this occurs. Referring to FIG. 10, by selecting first the animation player play area 131 and then the audio player play area 143 and then the co-occur tool 70, it is ensured that the animation player part and the audio player part will start and stop simultaneously. Since the audio was only about 30 seconds in length, the audio will obviously have to be replayed to reach the 100 second length of the animation.

Figure 11:
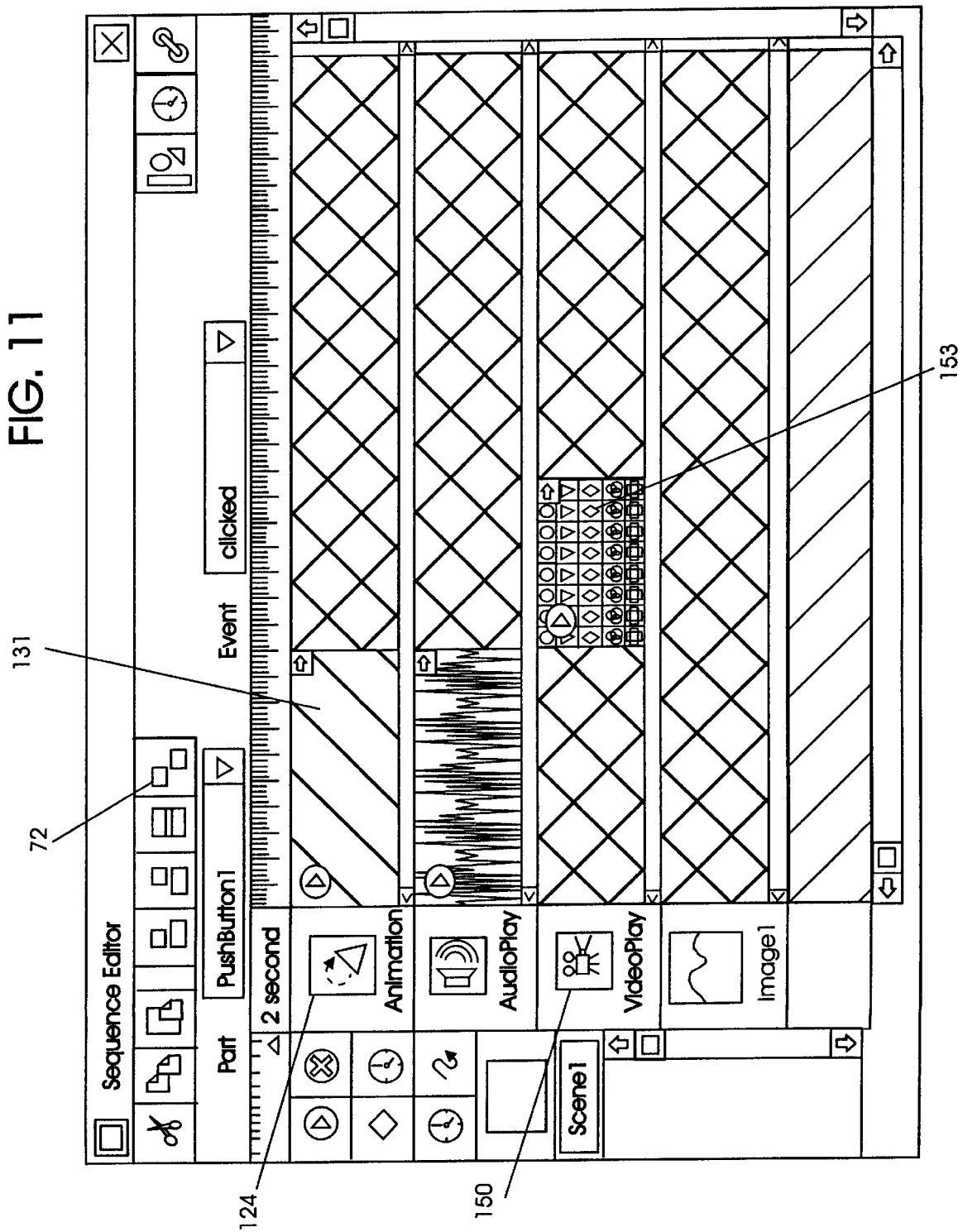
FIG. 11 is an illustration of the use of a meet tool.

Similarly, referring to FIG. 11, the video is to begin as soon as the animation ends. Thus, the developer first selects the animation player play area 131, then the video player play area 153 and, finally, the meet tool 72. By so doing, the developer has now ensured simply and quickly that the video will start upon the conclusion of the animation.

The use of the co-tools as described includes an important embodiment of this invention. These tools allow automatic implementation of time alignment of three types: 1) absolute time, 2) relative time, and 3) event driven time. In terms of background, it may be helpful to elaborate on absolute time (aT), relative time (rT), and event drive time (eT). Absolute time (aT) is time that has a fixed starting point. It may originally be specified as offset from some relative time (rT) or some event driven point in time (eT), but aT is specified overtly herein with respect to a tick mark on the time-line. Given a particular time sequence, aT is declared independent of other parts. Relative time (rT) is time that has a starting (or ending or both) point relative to some other part (or parts). Relative time (rT) is specified overtly with respect to the starting or ending of some other occurrence of something and its specific value is not known or declared. Event driven time (eT) is time that has a starting point that is defined by the occurrence of some event which may or may not have any relationship with time. An event could be a user interaction with a push button being selected or it could be an error condition. There are an infinite number of event types. Subsequent to specification of a part that is synchronized with eT, it is impossible to determine the point at which that time will occur. It will occur when that event occurs. As used herein, "einitiating appropriate part behavior" means to cause the part to be, for example, displayed or played as appropriate to the type of time based media part. It is to be understood that appropriate part behavior may encompass any behavior that the developer desires.

Bringing rT back to our example, the synchronization of the audio and animation via the co-occur tool is an implementation of specifying both the starting and ending rTs of the audio with respect to the animation. The synchronization of the video and animation via the meet tool is an implementation of specifying the starting rT of the video with respect to the ending time of the animation.

Bringing aT back to our example, the synchronization of the disappearance of the image at the absolute time mark of 30 seconds on the time-line is an implementation of specifying the starting aT of the image disappearance with respect to an absolute time on the time-line. The specification is achieved by overtly dragging the hide block start time to the 30 second tick mark.

Bringing eT back to our example, the initiation of the entire sequence of time based processing starts at the unknown time of selection of the clicked event of the push button part specified by the part and event starter drop down lists.

Figure 12:
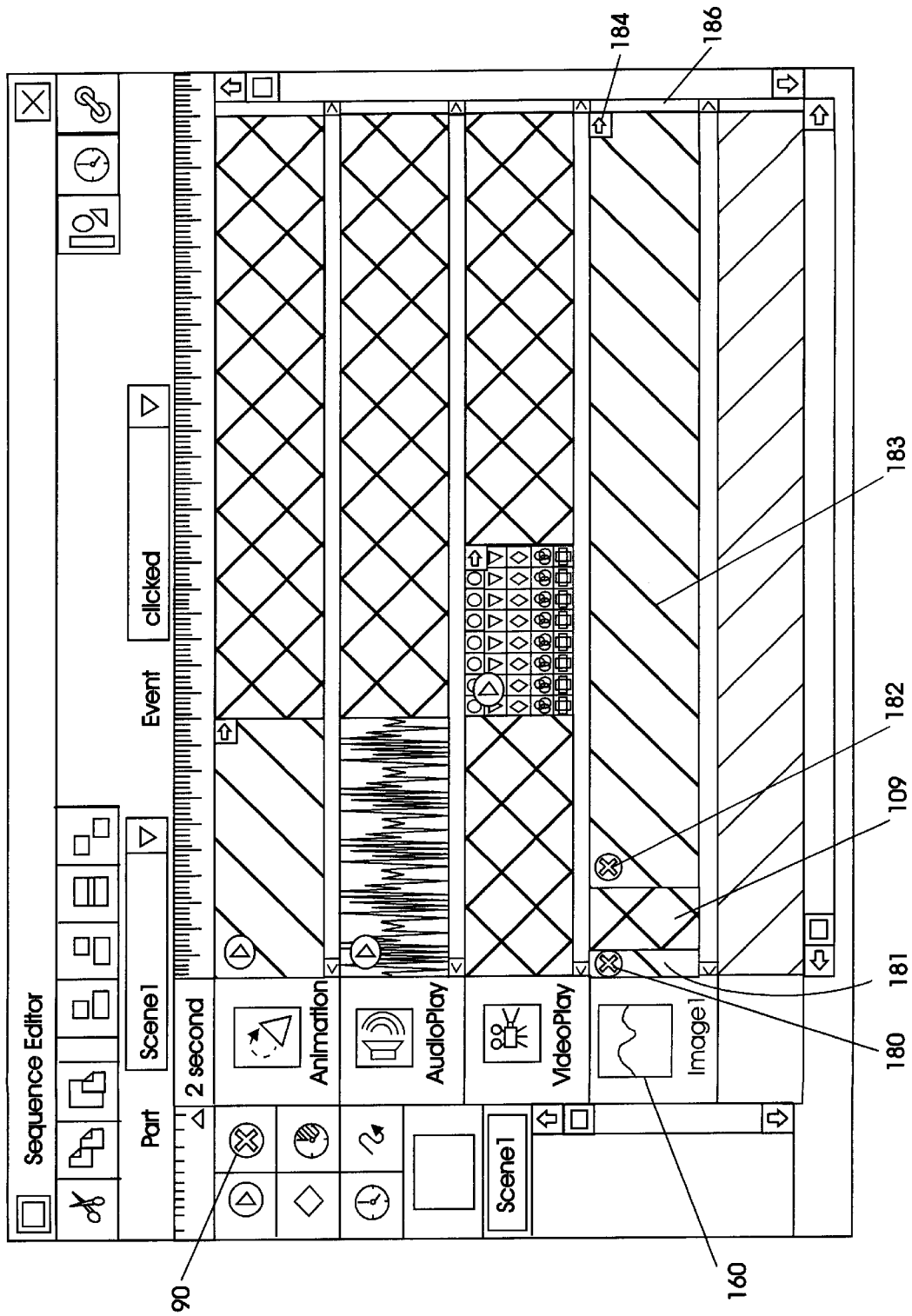
FIG. 12 is an illustration of use of a hide spacer.

Referring now to FIG. 12, it is still required to synchronize the Image 1 part 160. As required by the example, Image 1 part 160 is to appear ten seconds after the animation starts, remain visible for 20 seconds while moving across the screen, and then disappear. Therefore, the developer drags a hide spacer 90 and drops it onto the show block 109, as indicated by a hide icon 180 and a hide area 181. For convenience purposes only, the example shown has a hide area width of a predetermined value of ten seconds. Therefore, the hide icon 180 will cause the Image 1 part 160 to be hidden for the required ten seconds after the animation starts. The developer then grabs another hide spacer 90 and drops it onto the show block 109 as indicated by a hide icon 182. Then, by grabbing a size handle 184 and dragging to a wrap corral 186, it is ensured that the Image 1 part 160 will disappear after being visible for 20 seconds and not reappear, as shown by hide area 183. A wrap corral can be considered as infinity in the present invention. By using the wrap corral, a developer can "hook" the end time of a show or play block and thus have it continue to infinity.

Figure 14:
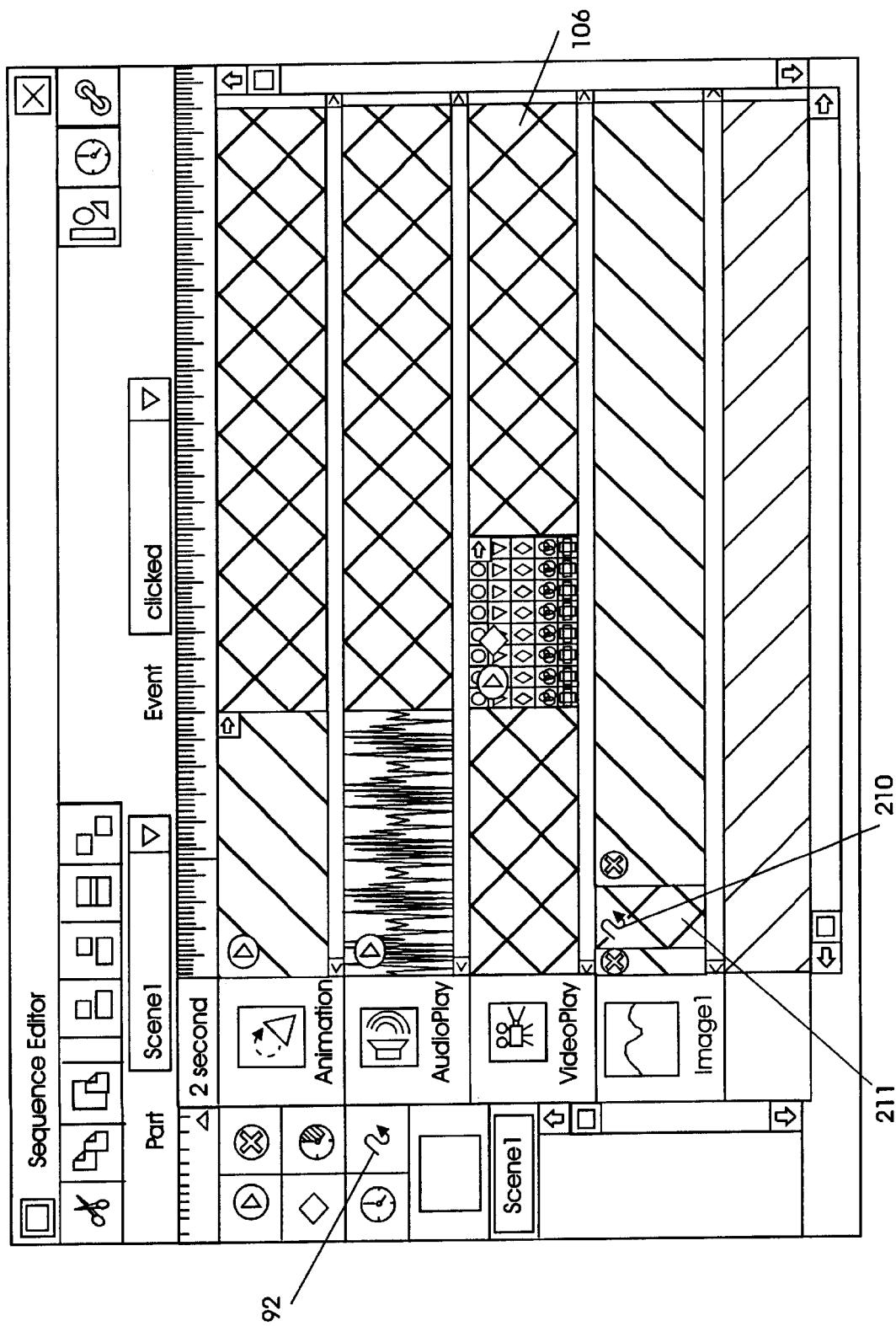
FIG. 14 is an illustration of use of the move spacer.
Figure 15:
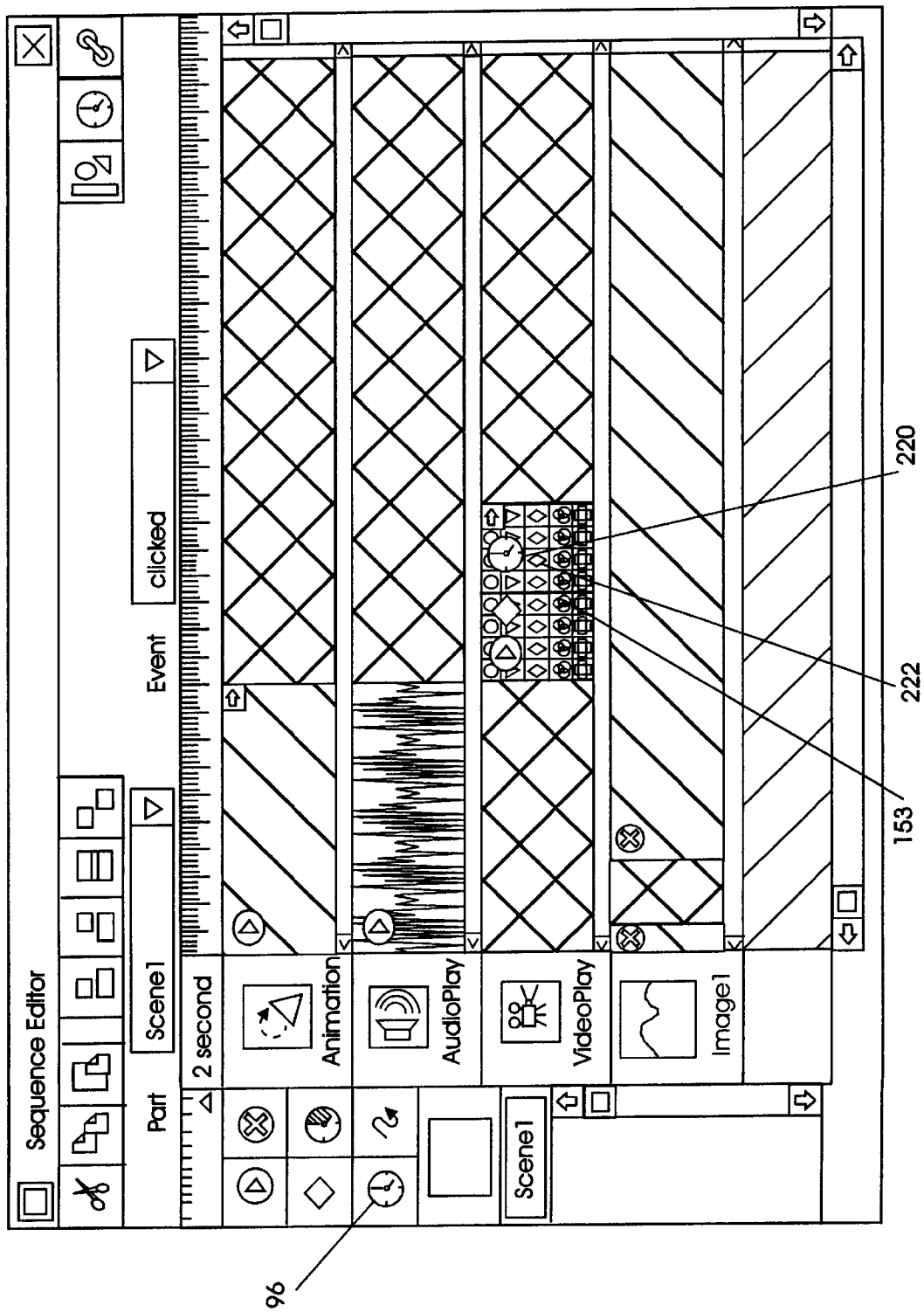
FIG. 15 is an illustration of use of the rate spacer.

In addition, continuing to use the above example, the image which is a welcome message to the student is to move in a straight line across the screen from left to right during the 20 seconds that it is visible. To accomplish this, the developer would select the move spacer 92 from the palette of tools and drop it on the visibility block 109 as indicated by icon 210 and area 211 (FIG. 14). The visibility block 109 (FIG. 12) is now shown as area 211 from an absolute time of 10 seconds until an absolute time of 30 seconds. Of course, this sequence is relative to the event time of the clicked event. The beginning (left edge) of the move spacer area 211 is dragged to the absolute time of 10 seconds. The ending time (right edge) of the move spacer area 211 (size handle) is dragged to the absolute time of 30 seconds. This move spacer area 211 now indicates that during the course of its time (i.e., aT 10 until aT 30) the image will not only be visible, but will move along some path. To those knowledgeable in the art of animation and computer graphics, there are many well known mechanisms to define such a path. Macromedia's Director, for example, describes in their guide at pages 113 and 114 their specification technique to allow a user of their tool to specify a path for motion of an image. There is no claim herein of novelty in motion specification techniques. As a result, we will assume that "double clicking" the move spacer icon, once it is placed on the visibility block of the image, allows the user to specify a motion path for the image that is moving across the screen. The uniqueness herein is that once a path is specified, the sequence editor of the present invention has provided an easy to use mechanism that synchronizes the movement across the screen with the length of time the move spacer occupies.

Figure 13:
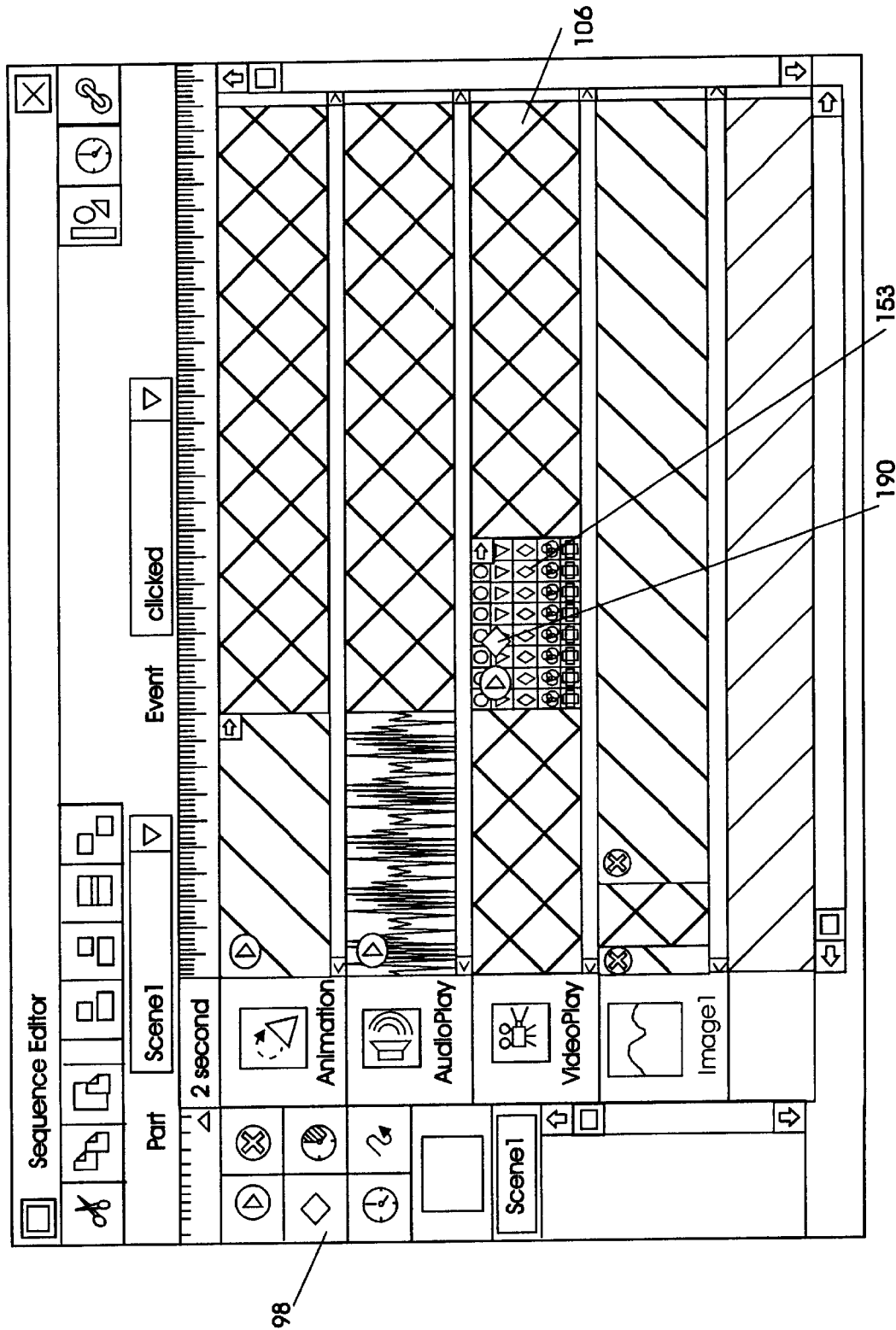
FIG. 13 is an illustration of placement of a time event specifier.

Referring to FIG. 13, the developer drags and drops a time event specifier 98 onto the video play area 153 as indicated by a specifier icon 190. By positioning the time event specifier icon 190 (an arbitrary unique event) properly thereon, the developer may then trigger another unique event at the desired time. This unique event could then cause another sequence to occur or, as in our real world example, it could cause some other processing to make a push button appear, which allows for termination of the video, if desired.

Figure 17:
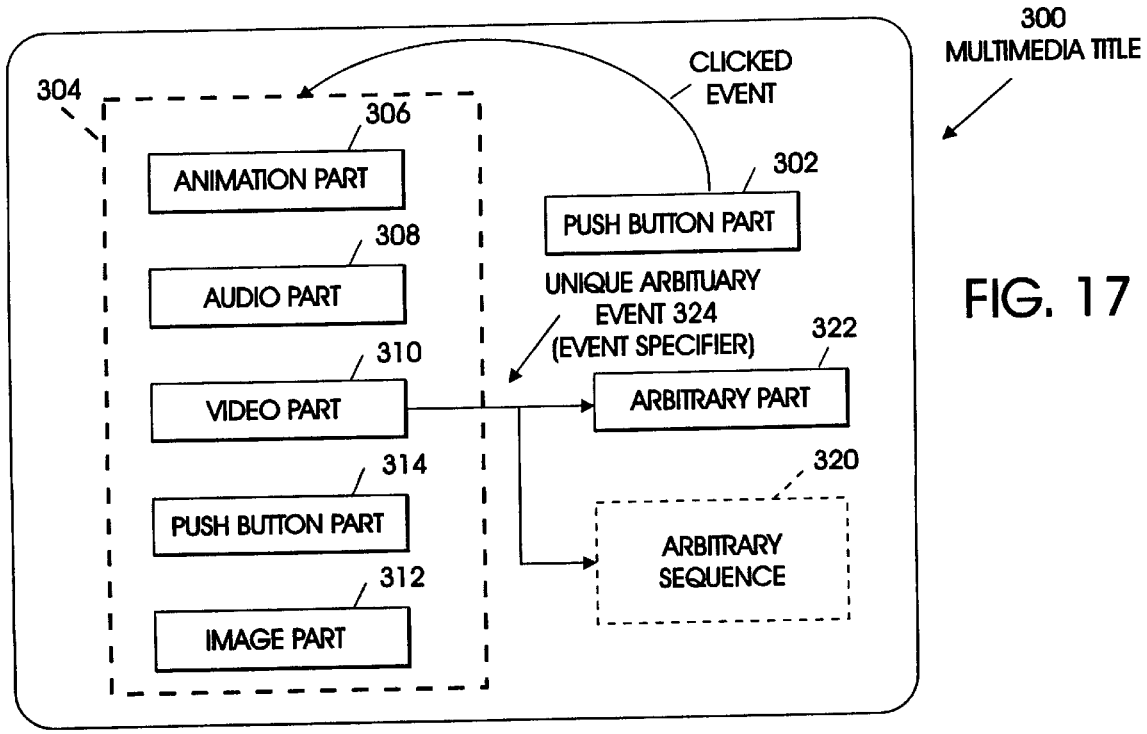
FIG. 17 is a schematic illustration of a multimedia title and use of an event specifier.

Referring to FIG. 17, the event specifier of FIG. 13 is graphically illustrated in use. As previously described with respect to FIG. 16, the multimedia title 300 is created. It is desired by the developer to generate a new arbitrary sequence 320 or a new arbitrary part 322 by a unique arbitrary event 324 (i.e., at a particular time, encountering the event specifier). Thus, as per the description above, the event specifier allows generation of the unique event.

An addition to the above example, it may be desired to have the second half of the video played at twice the normal speed. This could be necessary due to the time requirements levied on the curriculum. To accomplish this, a developer would select the rate spacer 96 (see FIG. 15) from the palette of tools and drop it on the video play area 153 as indicated by icon 220 and area 222. Using normal drag techniques and the size handle, the area 222 is adjusted to occupy the second half of the video play area 153. Although it is not part of the present invention, the developer could, for example, then double click on the rate spacer icon 220 and a dialog box would appear to query the developer for the rate required. The second half of the video would then play at the new rate.

Thus, the present invention provides heretofore unavailable simplicity of use for the multimedia title developer. The developer has all the tools necessary to create a synchronized multimedia title in an easy to use visual interface type application. Events and parts can be synchronized using absolute time, relative time and/or event time which allows the developer a great deal of flexibility. The sequence editor, as taught herein, provides for the developer a view of the multimedia title from the perspective of its time structure as opposed to previously available data flow or user interface perspectives.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A method of synchronizing on a computer system a multimedia title which is comprised of a plurality of parts, comprising the steps of:

displaying an at-a-glance visual layout of synchronization of the plurality of parts;

synchronizing at least one of the parts with reference to absolute time represented by a time-line associated with said visual layout;

automatically synchronizing with at least one user selectable co-tool associated with said visual layout at least one of the parts with reference to relative time; and synchronizing at least one of the parts with reference to event time represented by an arbitrary event raised by an arbitrary part.

2. The method of claim 1, wherein the step of automatically synchronizing with at least one user selectable co-tool associated with said visual layout at least one of the parts with reference to relative time comprises the step of:

automatically synchronizing start times of said parts with a user selectable co-begin tool.

3. The method of claim 1, wherein the step of automatically synchronizing with at least one user selectable co-tool associated with said visual layout at least one of the parts with reference to relative time comprises the step of:

automatically synchronizing end times of said parts with a user selectable co-end tool.

4. The method of claim 1, wherein the step of automatically synchronizing with at least one user selectable co-tool associated with said visual layout at least one of the parts with reference to relative time comprises the step of:

automatically synchronizing start and end times of said parts with a user selectable co-occur tool.

5. The method of claim 1, wherein the step of automatically synchronizing with at least one user selectable co-tool associated with said visual layout at least one of the parts with reference to relative time comprises the step of:

automatically synchronizing a start time of said at least one of the parts with an end time of said at least one other of the parts with a user selectable meet tool.

6. A system for synchronizing on a computer a multimedia title which is comprised of a plurality of parts, comprising:

means for displaying an at-a-glance visual layout of synchronization of the plurality of parts;

means for synchronizing at least one of the parts with reference to absolute time represented by a time-line associated with said visual layout;

means for automatically synchronizing with at least one user selectable co-tool associated with said visual layout at least one of the parts with reference to relative time; and means for synchronizing at least one of the parts with reference to event time represented by an arbitrary event raised by an arbitrary part.

7. The system of claim 6, wherein said means for automatically synchronizing with at least one user selectable co-tool associated with said visual layout at least one of the parts with reference to relative time comprises:

a user selectable co-begin tool for automatically synchronizing start times of said parts.

8. The system of claim 6, wherein said means for automatically synchronizing with at least one user selectable co-tool associated with said visual layout at least one of the parts with reference to relative time comprises:

a user selectable co-end tool for automatically synchronizing end times of said parts.

9. The system of claim 6, wherein said means for automatically synchronizing with at least one user selectable co-tool associated with said visual layout at least one of the parts with reference to relative time comprises:

a user selectable co-occur tool for automatically synchronizing start and end times of said parts.

10. The system of claim 6, wherein said means for automatically synchronizing with at least one user selectable co-tool associated with said visual layout at least one of the parts with reference to relative time comprises:

a user selectable meet tool for automatically synchronizing a start time of said at least one of the parts with an end time of said at least one other of the parts.

11. A computer program product recorded on computer readable medium for synchronizing a multimedia title which is comprised of a plurality of parts, comprising:

computer readable means for displaying an at-a-glance visual layout of synchronization of the plurality of parts;

computer readable means for synchronizing at least one of the parts with reference to absolute time represented by a time-line associated with said visual layout;

computer readable means for automatically synchronizing with at least one user selectable co-tool associated with said visual layout at least one of the parts with reference to relative time; and computer readable means for synchronizing at least one of the parts with reference to event time represented by an arbitrary event raised by an arbitrary part.

12. The computer program product of claim 11, wherein said computer readable means for automatically synchronizing with at least one user selectable co-tool associated with said visual layout at least one of the parts with reference to relative time comprises:

computer readable means for automatically synchronizing start times of said parts with a user selectable co-begin tool.

13. The computer program product of claim 11, wherein said computer readable means for automatically synchronizing with at least one user selectable co-tool associated with said visual layout at least one of the parts with reference to relative time comprises:

computer readable means for automatically synchronizing end times of said parts with a user selectable co-end tool.

14. The computer program product of claim 11, wherein said computer readable means for automatically synchronizing with at least one user selectable co-tool associated with said visual layout at least one of the parts with reference to relative time comprises:

computer readable means for automatically synchronizing start and end times of said parts with a user selectable cooccur tool.

15. The computer program product of claim 11, wherein said computer readable means for automatically synchronizing with at least one user selectable co-tool associated with said visual layout at least one of the parts with reference to relative time comprises:

computer readable means for automatically synchronizing a start time of said at least one of the parts with an end time of said at least one other of the parts with a user selectable meet tool.

* * * * *